United States Patent
Minshall (10) Patent No.: US 6,987,774 B1
(45) Date of Patent: Jan. 17, 2006

(54) METHOD AND APPARATUS FOR TRAFFIC SCHEDULING

(75) Inventor: Gregory G. Minshall, Albany, CA (US)

(73) Assignee: Redback Networks Inc., San Jose, CA (US)

(*) Notice: Subject to any disclaimer, the term of this patent is extended or adjusted under 35 U.S.C. 154(b) by 946 days.

(21) Appl. No.: 09/885,372

(22) Filed: Jun. 20, 2001

(51) Int. Cl.
*H04L 12/54* (2006.01)
(52) U.S. Cl. ...................................... 370/429; 370/412
(58) Field of Classification Search ................ 370/229, 370/230, 412, 413, 395.41, 395.42, 366, 370/368, 371, 374, 378, 379, 381, 382, 395.71, 370/414–429
See application file for complete search history.

(56) References Cited

U.S. PATENT DOCUMENTS

| | | | | |
|---|---|---|---|---|
| 5,850,399 A | * | 12/1998 | Ganmukhi et al. | 370/412 |
| 5,905,730 A | * | 5/1999 | Yang et al. | 370/429 |
| 6,034,960 A | * | 3/2000 | Beshai et al. | 370/395.4 |
| 6,047,000 A | * | 4/2000 | Tsang et al. | 370/412 |
| 6,229,812 B1 | * | 5/2001 | Parruck et al. | 370/412 |
| 6,389,019 B1 | * | 5/2002 | Fan et al. | 370/395.42 |

OTHER PUBLICATIONS

B. Braden, et al., Recommendations on Queue Management and Congestion Avoidance in the Internet, RFC 2309, Internet Task Force, Apr. 1998.
Pawan Goyal, Harrick Vin and Haichen Cheng, Start-time Fair Queueing: A Scheduling Algorithm for Integrated Services Packet Switching Networks. SIGCOMM Symposium on Communications Architectures and Protocols, Aug. 1996.
S. Keshav, An Engineering Approach to Computer Networking: ATM Networks, the Internet and the Telephone Network, Apr. 1997, Chapter 9, Addison Wesley Longman, Inc.

* cited by examiner

*Primary Examiner*—Dang Ton
*Assistant Examiner*—Phuc Tran
(74) *Attorney, Agent, or Firm*—Blakely, Sokoloff, Taylor & Zafman LLP (57) ABSTRACT

A method and apparatus for traffic scheduling is described. A computer implemented method comprises combining a priority scheme with a generalized processor sharing scheme to schedule transmission of a set of data and transmitting the set of data as scheduled.

21 Claims, 6 Drawing Sheets

METHOD AND APPARATUS FOR TRAFFIC SCHEDULING

BACKGROUND OF THE INVENTION

1. Field of the Invention

The invention relates to the field of communications. More specifically, the invention relates to transmission over communication networks.

2. Background of the Invention

Various scheduling methods are used to support various levels of service. These services fall into one of two categories: priority based schedulers and round robin schedulers. A priority based scheduler always transmits the highest priority packets in one of its queues. A round robin scheduler transmits packets from each nonempty connection queue ("An Engineering Approach to Computer Networking", Kehsav, p. 236 (1997)). A weighted round robin scheduler transmits packets from each nonempty connection queue in proportion to each queue's "weight".

Unfortunately, higher priority packets can starve out lower priority traffic with a priority based scheduler. With a weighted round robin scheduler, low latency traffic may need to wait for an entire round (more than one packet transmission time) before being transmitted.

A method and apparatus for traffic scheduling is described. In one embodiment, a priority scheme is combined with a generalized processor sharing scheme to schedule transmission of a set of data and the set of data is transmitted as scheduled.

DETAILED DESCRIPTION OF THE DRAWINGS

In the following description, numerous specific details are set forth to provide a thorough understanding of the invention. However, it is understood that the invention may be practiced without these specific details. In other instances, well-known protocols, structures, processes and techniques have not been shown in detail in order not to obscure the invention.

Figure 1:
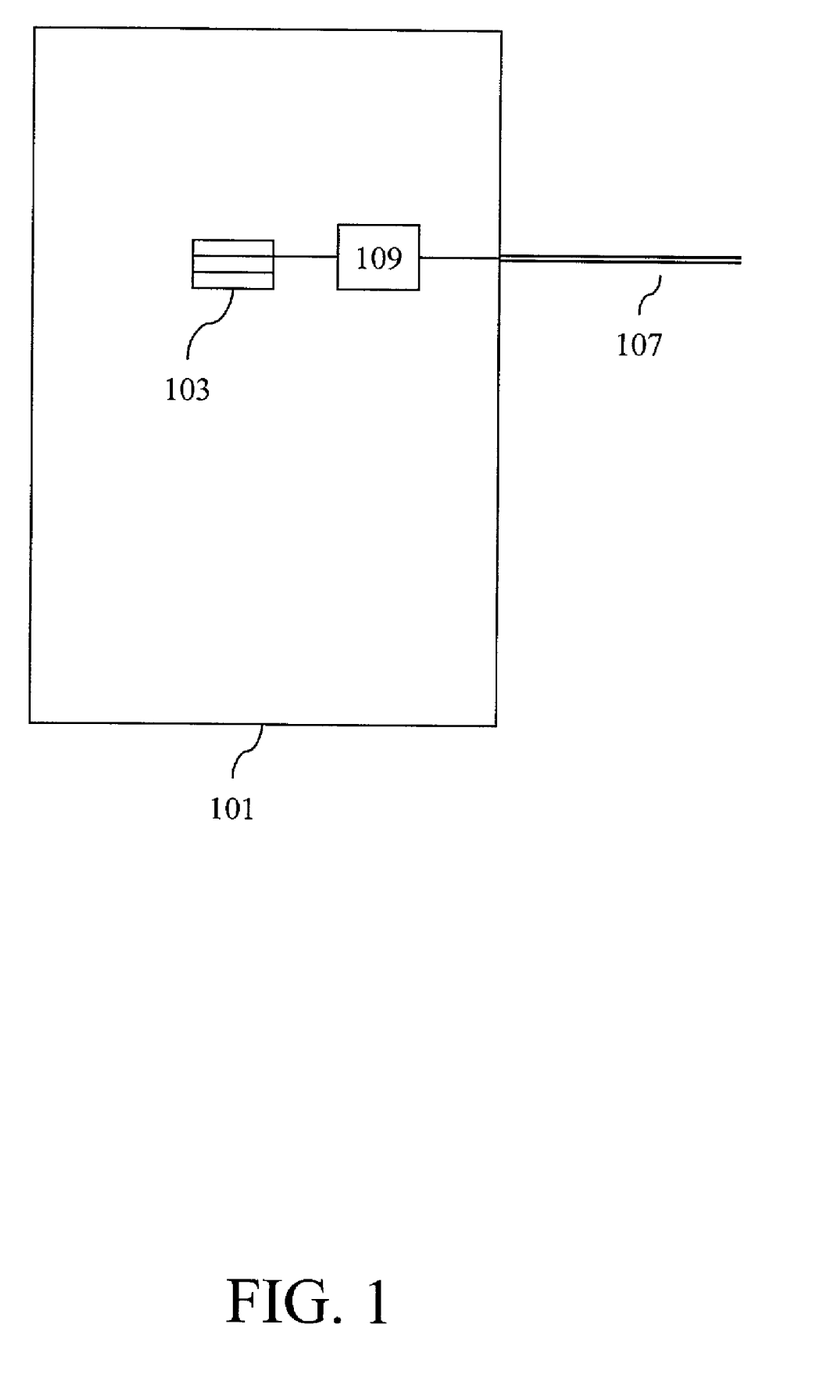
FIG. 1 is a diagram of a line card according to one embodiment of the invention.

FIG. 1 is a diagram of a line card according to one embodiment of the invention. In FIG. 1, the line card 101 is shown with a communication link 107. The communication link 107 connects to scheduler logic 109. The scheduler logic 109 connects to a set of queues 103. The set of queues 103 store traffic to be transmitted over the communication link 107. Although all of the traffic stored in the set of queues 103 will be transmitted over the communication link 107, the traffic can have different destinations. The queues 103 can correspond to customers, organizations, destinations, services, etc. The scheduler logic 109 determines when traffic stored in the queues 103 will be transmitted over the communications link 107.

Figure 2:
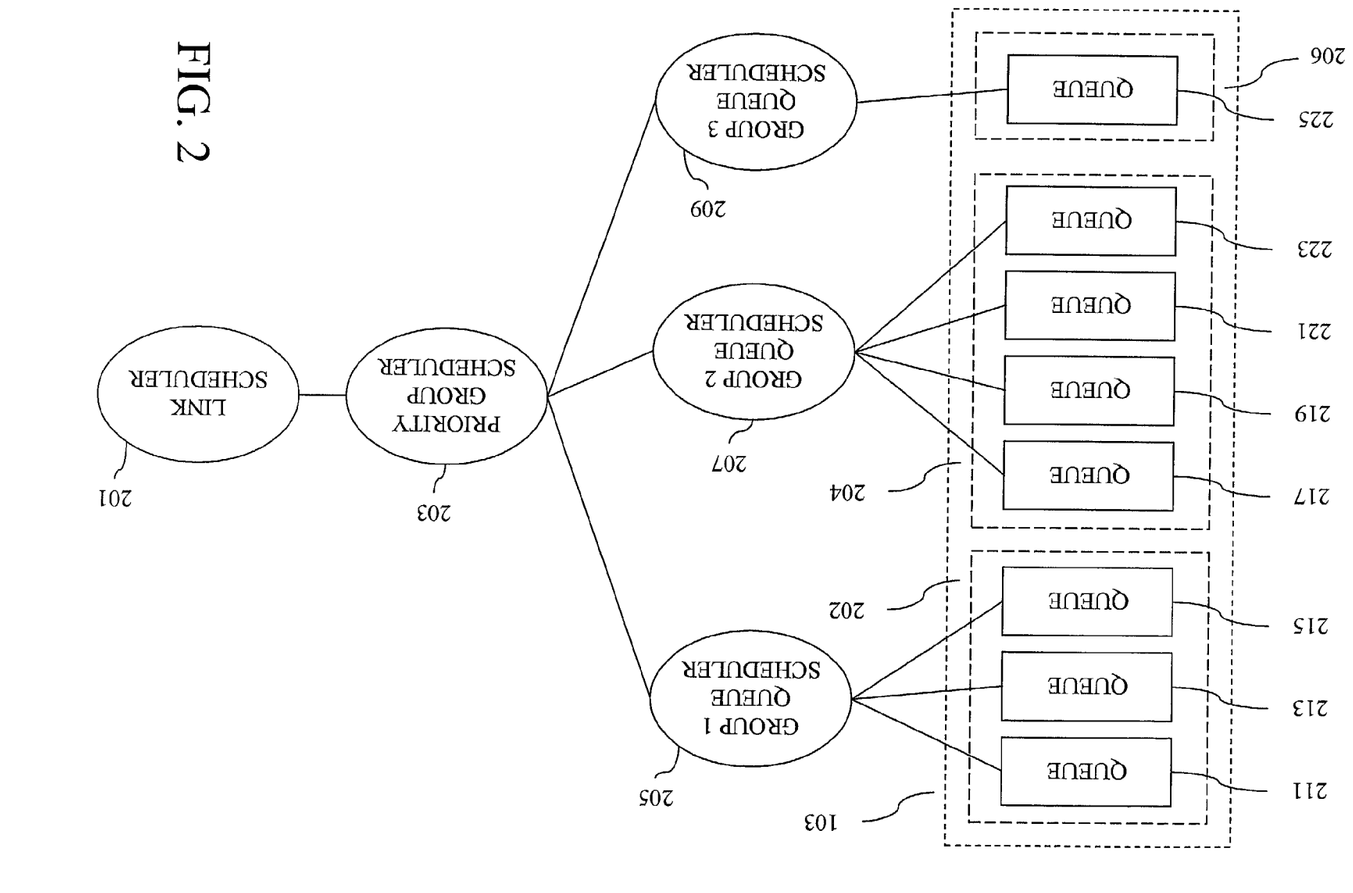
FIG. 2 is a diagram illustrating a packet scheduling mechanism according to one embodiment of the invention

FIG. 2 is a diagram illustrating a packet scheduling mechanism according to one embodiment of the invention. In FIG. 2, the set of queues 103 of FIG. 1 store traffic. The set of queues 103 are configured into groups. Queues 211, 213, and 215 are configured as a first group 202. Queues 217, 219, 221, and 223 are configured as a second group 204. The queue 225 is configured as a third group 206. A queue scheduler 205 determines which queue in the first group of queues 202 will transmit traffic at a given time. A queue scheduler 207 determines which queue in the second group of queues 204 will transmit traffic. A queue scheduler 209 determines which queue in the third group of queues 206 will transmit traffic. A priority group scheduler 203 determines which of the group of queues 202, 204, or 206 will transmit traffic. A link scheduler 201 determines when a link associated with the set of queues 103 can transmit.

Figure 3:
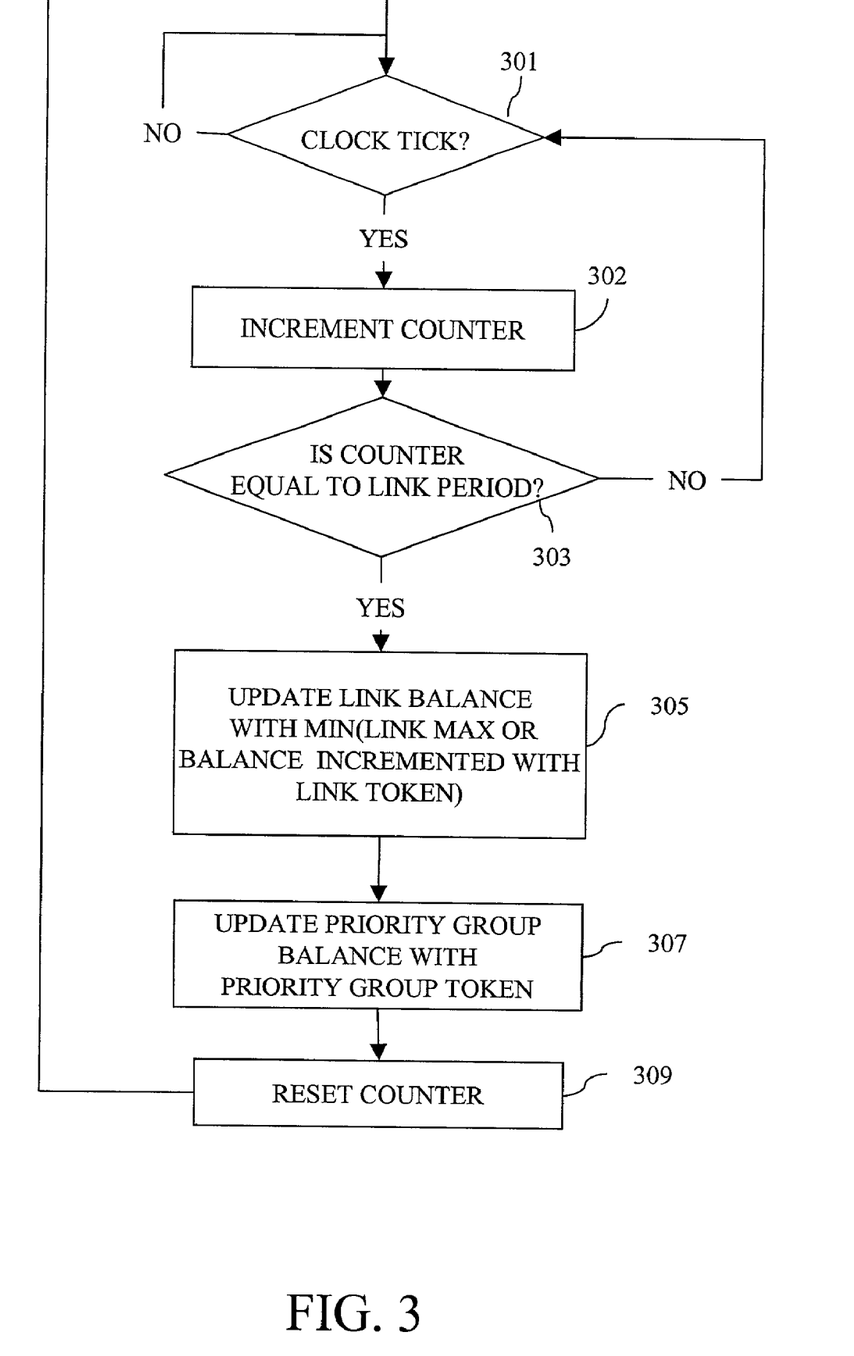
FIG. 3 is a flow chart for maintaining eligibility indicators according to one embodiment of the invention.

FIG. 3 is a flow chart for maintaining eligibility indicators according to one embodiment of the invention. In FIG. 3 at block 301, it is determined if a clock tick occurs. If a clock tick does not occur, then control loops back to block 301. If a clock tick occurs, then at block 302 a counter is incremented. At block 303, it is determined if the counter is equal to a link period. The link period can be adjusted in relation to the clock signals of a system. If the counter is not equal to or greater than the link period, then control flows back to block 301. If it is determined at block 303 that the counter is equal to or greater than the link period, then at block 305 a link balance is updated with a minimum of: 1) the link balance maximum; and 2) the link balance incremented with the link token. At block 307, a priority group "clock" is updated with a priority group token. At block 309, the counter is reset. Control flows back to block 301 from block 309.

Figure 4:
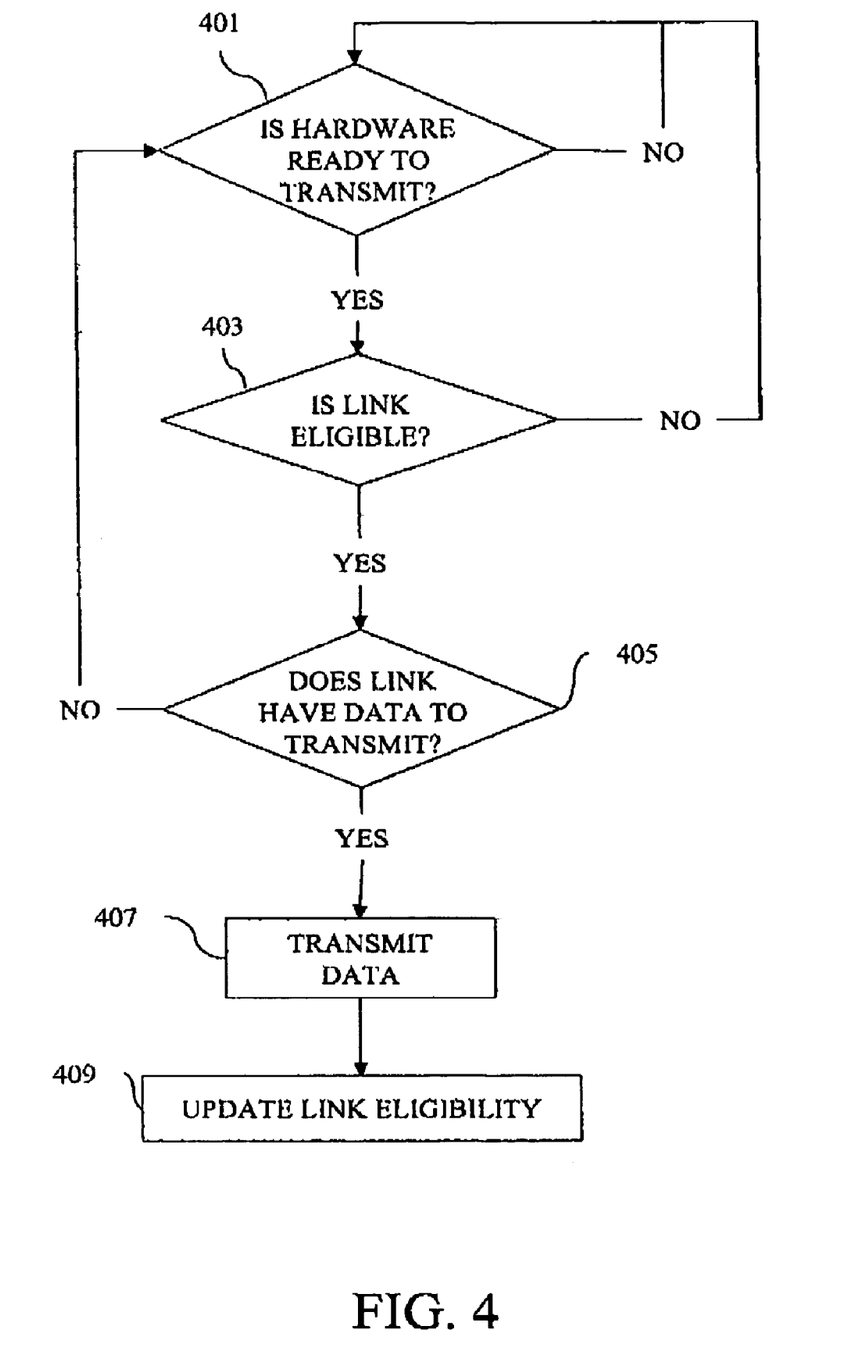
FIG. 4 is a flow chart for a link scheduler according to one embodiment of the invention.

FIG. 4 is a flow chart for a link scheduler according to one embodiment of the invention. At block 401 of FIG. 4, it is determined if the hardware is ready to transmit. The hardware may be in a "flow controlled" or "not ready" state. The hardware may also still be transmitting the previous packet. If the hardware is not ready to transmit, then control loops back to block 401. If the hardware is ready to transmit, then at block 403 it is determined if the link is eligible to transmit. In one embodiment of the invention, if the link balance is equal to or less than a given value (e.g., zero), then the link is not eligible to transmit. If the link is not eligible to transmit, then control loops back to block 401, allowing another link to possibly transmit. In another embodiment of the invention, control does not loop back for another link because the links have individual flows occurring in parallel. If the link is eligible to transmit, then at block 405 it is determined if the link has data to transmit. If the link does not have data to transmit, then control loops back to block 401. In alternative embodiments of the invention, a "burst" value is maintained and updated when a link is eligible to transmit, but does not transmit. The burst value enables a link to transmit a burst of data after being idle. If the link has data to transmit, then at block 407, the link transmits data. At block 409, the link balance is updated. In one embodiment of the invention, the link balance is decremented by the cost of transmitting the data. The cost of the data transmission may bring the balance to zero or less than zero. In one embodiment of the invention, a lower limit is placed on the balance to prevent a link from being starved of transmission time after a large burst of data. The cost of the data can vary depending on implementation of the invention. The cost of transmitting the data can be calculated based on the size of the data. The cost of transmitting the data could also be calculated using the size of the data and a modifier for the data type. These examples are intended to aid in understanding the invention and not meant to limit the invention.

Figure 5:
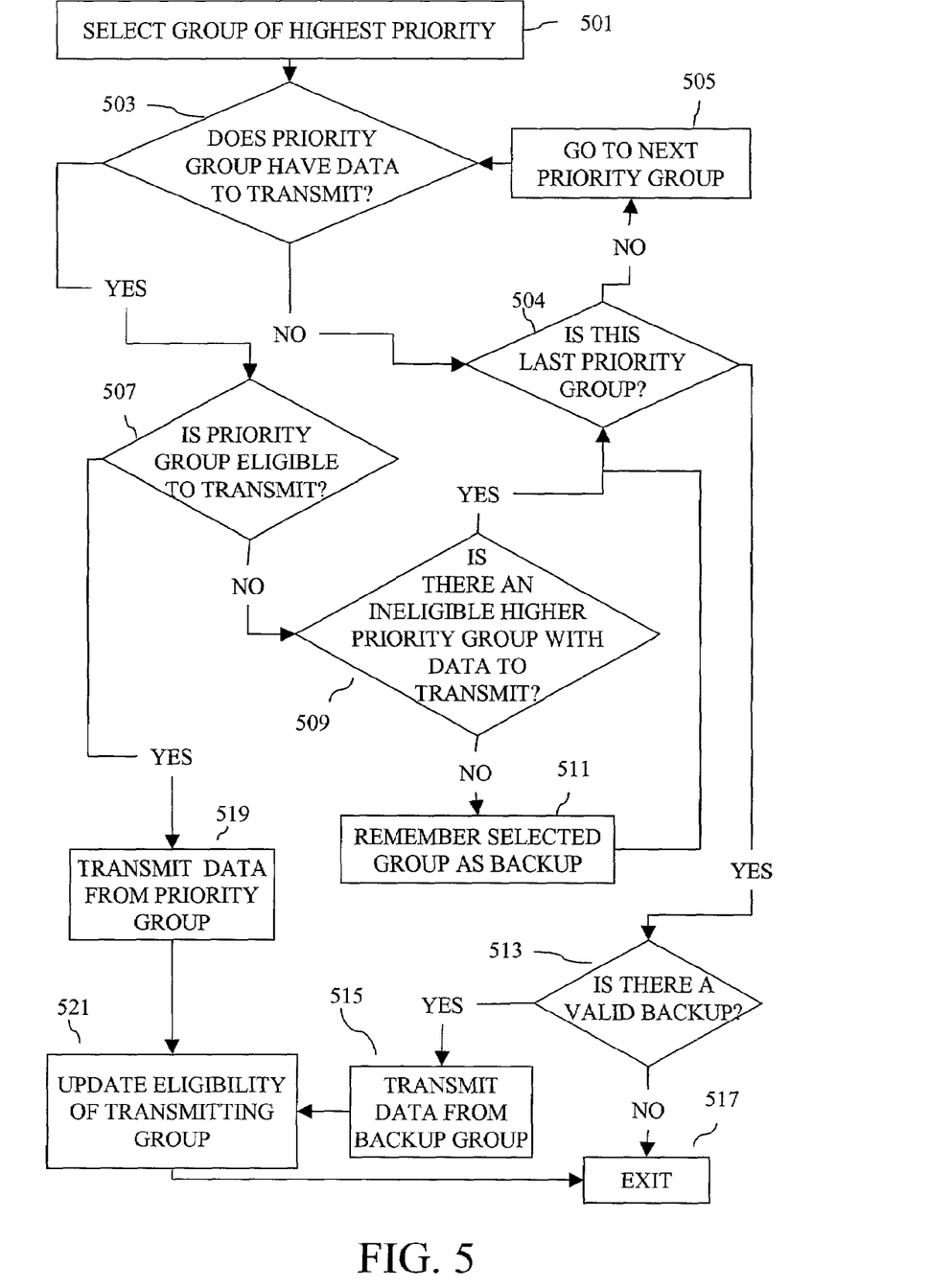
FIG. 5 if a flowchart for a priority group scheduler according to one embodiment of the invention.

FIG. 5 is a flowchart for a priority group scheduler according to one embodiment of the invention. At block 501, a highest priority group is selected. At block 503, it is determined if the selected priority group has data to transmit. If the selected group does not have data to transmit, then at block 504 the scheduler determines if the selected priority group is the last priority group. If the selected priority group is not the last priority group, then the scheduler selects the next highest priority group at block 505. Control flows from block 505 to block 503. If the selected priority group has data to transmit, then at block 507 it is determined if the selected priority group is eligible to transmit. Eligibility can be determined in a number of ways as described above. In one embodiment of the invention, an eligibility value (initialized to zero) is compared with the priority group balance. If the eligibility value is less than the priority group balance, then the priority group is eligible to transmit data. If the selected priority group is eligible to transmit data, than at block 519 the data is transmitted from the selected priority group. At block 521, the eligibility value for the transmitting priority group is updated. From block 521, control flows to block 517 where the scheduler exits.

If the scheduler determines at block 507 that the selected priority group is not eligible, then at block 509 the scheduler determines if there is an ineligible higher priority group with data to transmit. If there is not an ineligible higher priority group with data, then at block 511 the selected priority group becomes a backup transmitting group. From block 511, control flows to block 504. If the scheduler determines at block 509 that there is an ineligible higher priority group with data to transmit, then control flows to block 504. If the scheduler determines at block 504 that the selected priority group is the last priority group, then at block 513 the scheduler determines if there is a valid backup group. If the scheduler determines that there is not a valid backup group, then at block 517 the scheduler exits. If the scheduler determines at block 513 that there is a valid backup group, then at block 515 the backup group transmits its data. In another embodiment of the invention, ineligible priority groups are restricted from transmitting. Control flows from block 515 to block 521. In one embodiment of the invention, if an ineligible priority group transmits data, then the priority group balance is updated with the cost of the transmission.

Figure 6:
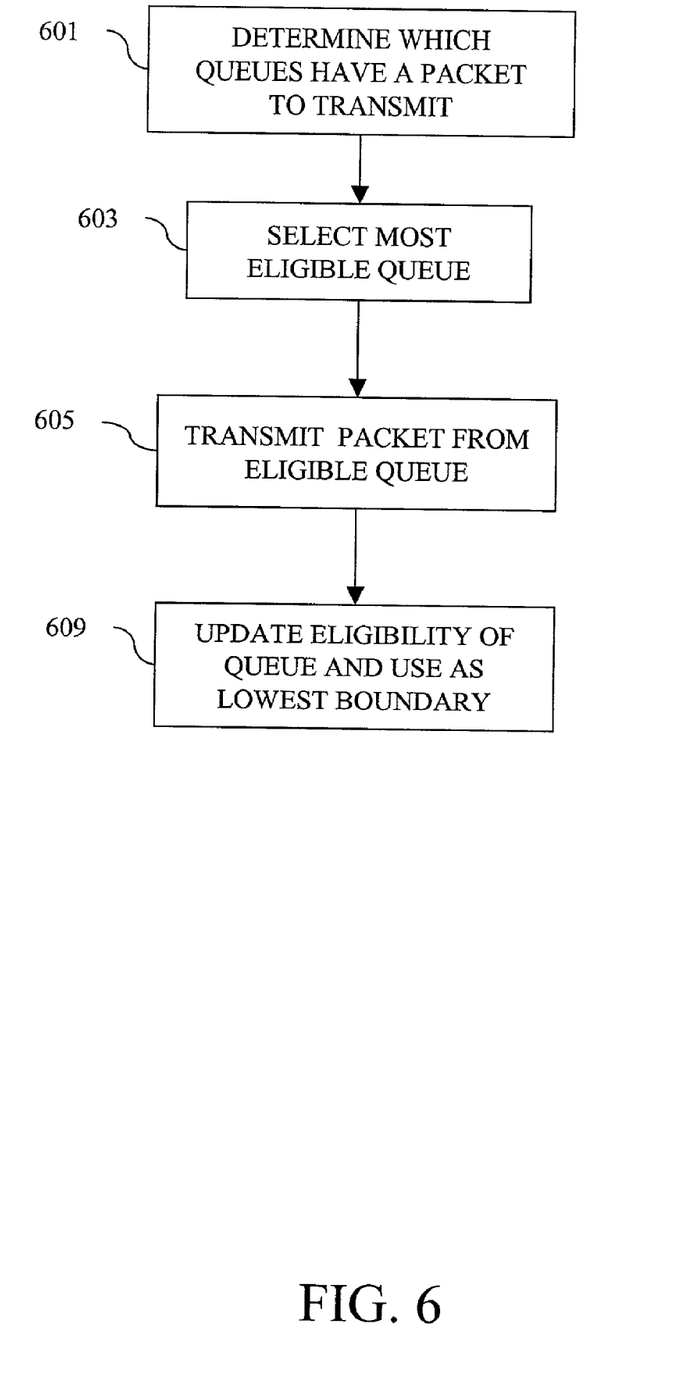
FIG. 6 is a flowchart for a queue scheduler according to one embodiment of the invention.

FIG. 6 is a flowchart for a queue scheduler according to one embodiment of the invention. At block 601, the queue scheduler determines which queues have data to transmit. At block 603, the queue scheduler selects the most eligible queue. The most eligible queue can be determined in a variety of ways. In one embodiment of the invention, the queue with the lowest eligibility value is the most eligible queue. In another embodiment of the invention, the queue with the highest eligibility value is the most eligible queue. In another embodiment of the invention, the queue with an eligibility value greater than all other eligibility values but less than a "clock" value is the most eligible queue. At block 605, data is transmitted from the selected queue. At block 607, an eligibility value for the selected queue is updated. In one embodiment of the invention, the eligibility value for the selected queue is used by the queue scheduler as a lower boundary for the next transmitting queue's eligibility value.

A packet scheduler combining features of priority-based schedulers and generalized processor sharing schedulers (i.e., round robin schedulers, fair queuing schedulers, etc.) prevents higher priority traffic from starving lower priority traffic while preventing lower priority traffic from delaying higher priority traffic. Such a packet scheduler enables a network element to allocate different levels of service to different classes of traffic. A network element with this scheduler can offer various service levels including low-latency traffic, guaranteed bandwidth traffic, and best-effort traffic.

The described line card include memories, processors, and/or Application Specific Integrated Circuits ("ASICs"). Such memory includes a machine-readable medium on which is stored a set of instructions (i.e., software) embodying anyone, or all, of the methodologies described herein. Software can reside, completely or at least partially, within this memory and/or within the processor and/or ASICs. For the purpose of this specification, the term "machine-readable medium" shall be taken to include any mechanism that provides (i.e., stores and/or transmits) information in a form readable by a machine (e.g., a computer). For example, a machine-readable medium includes read only memory ("ROM"), random access memory ("RAM"), magnetic disk storage media, optical storage media, flash memory devices, electrical, optical, acoustical, or other form of propagated signals (e.g., carrier waves, infrared signals, digital signals, etc.), etc.

While the invention has been described in terms of several embodiments, those skilled in the art will recognize that the invention is not limited to the embodiments described.

The method and apparatus of the invention can be practiced with modification and alteration within the spirit and scope of the appended claims. The description is thus to be regarded as illustrative instead of limiting on the invention.

I claim:

1. A machine-readable medium that provides instructions, which when executed by a set of processors of one or more processors, cause said set of processors to perform operations comprising:

determining a subset of queues to be of highest priority from a set of queues eligible to transmit;

determining one of the subset of queues to be most eligible to transmit, wherein determining one of the subset of queues to be most eligible to transmit comprises:

calculating a first value for the one of the subset of queues as being less than a transmit clock value and having a greatest difference from the transmit clock value;

transmitting data from the one of the subset of queues;

updating the first value indicating when the one of the subset will be eligible to transmit; and updating a second value indicating when the subset of queues will be eligible to transmit.

2. The machine-readable medium of claim 1 wherein the first and second value is updated with a cost of a set of data transmitted from the one of the subset of queues.

3. The machine-readable medium of claim 1 wherein updating the first and second value comprises:

increasing the first and second value with a size of a set of data transmitted from the one of the subset of queues; and modifying the increased first an second value respectively with a first and second weight respectively corresponding to the one of the subset of queues and the subset of queues.

4. The machine-readable medium of claim 1 further comprising maintaining a third value indicating unused transmit time.

5. The machine-readable medium of claim 1 further comprising
determining the subset of queues to be ineligible to transmit;
determining a second subset of queues to be of highest priority of a second set of queues eligible to transmit;
determining one of the second subset of queues to be most eligible to transmit;
transmitting data from the one of the second subset of queues; updating a third value indicating when the one of the second subset will be eligible to transmit; and
updating a fourth value indicating when the second subset of queues will be eligible to transmit.

6. The machine-readable medium of claim 1 further comprising
determining the subset of queues to be of highest priority from the set of queues eligible to transmit;
determining a second one of the subset of queues to be most eligible to transmit;
transmitting data from the second one of the subset of queues;
updating a third value indicating when the second one of the subset will be eligible to transmit; and
updating the second value indicating when the subset of queues will be eligible to transmit.

7. A machine-readable medium that provides instructions, which when executed by a set of processors of one or more processors, cause said set of processors to perform operations comprising:
prioritizing a first and second set of queues, the first set of queues being of higher priority;
determining one of the first set of queues to be most eligible to transmit data, wherein determining one of the first set of queues to be most eligible to transmit data comprises:
calculating a first value for the one of the first set of queues as being less than a transmit clock value and having a greatest difference from the transmit clock value;
transmitting a set of data from the one of the first set of queues;
updating the first value with a cost of the set of data, the first value indicating when the one of the first set of queues will be eligible to transmit; and
updating a second value indicating when the first set of queues will be eligible to transmit with the cost of the set of data.

8. The machine-readable medium of claim 7 wherein updating the first and second value comprises:
increasing the first and second value with a size of the set of data transmitted; and
modifying the increased first and second value respectively with a first and second weight respectively corresponding to the one of the first set of queues and the first set of queues.

9. The machine-readable medium of claim 7 further comprising maintaining a third value indicating unused transmit time.

10. A machine-readable medium that provides instructions, which when executed by a set of processors of one or more processors, cause said set of processors to perform operations comprising:
determining if at least one of a plurality of groups is eligible to transmit, each of the plurality of groups comprising a set of queues;
selecting an eligible one of highest priority of the plurality of groups having data to transmit upon determining at least one of the plurality of groups is eligible to transmit;
selecting an ineligible one of the highest priority of the plurality of groups having data to transmit upon determining at least one of the plurality of groups is not eligible to transmit;
determining a queue having data as most eligible from the set of queues of the selected one of the plurality of groups, wherein determining a queue having data as most eligible from the set of queues of the selected one of the plurality of groups comprises:
calculating a first value for the queue as being less than a transmit clock value and having a greatest difference from the transmit clock value;
transmitting a set of data from the queue;
updating the first value with the cost of the set of data, the first value indicating when the transmitting queue will be eligible to transmit; and
updating a second value with the cost of the set of data, the second value indicating when the selected one of the plurality of groups will be eligible to transmit.

11. The machine-readable medium of claim 10 wherein updating the first and second value comprises:
increasing the first and second value with a size of the set of data transmitted; and
modifying the increased first and second value respectively with a first and second weight respectively corresponding to the transmitting queue and the selected one of the plurality of queues.

12. The machine-readable medium of claim 10 further comprising maintaining a third value indicating unused transmit time.

13. An apparatus comprising:
a set of queues to store a set of data;
a first logic coupled to the set of queues, the first logic to determine priority and eligibility of a plurality of subsets of the set of queues, wherein the first logic to determine eligibility of a plurality of subsets comprises:
logic to calculate a first value for the one of the first set of queues as being less than a transmit clock value and having a greatest difference from the transmit clock value;
a second logic coupled to the first logic and the set of queues, the second logic to determine eligibility of each queue of one of the plurality of subsets, the one being indicated by the first logic; and
a transmitting unit coupled to the set of queues, the transmitting unit to transmit the set of data.

14. The apparatus of claim 13 wherein each of the set of queues is allocated for separate entities.

15. The apparatus of claim 13 further comprising:
the first logic to update a first eligibility value for a transmitting subset of the set of queues; and
the second logic to update a second eligibility value for a transmitting queue.

16. A computer implemented method comprising:
prioritizing a first and second set of queues, the first set of queues being of higher priority;
determining one of the first set of queues to be most eligible to transmit data, wherein determining one of the first set of queues to be most eligible to transmit data comprises:
calculating a first value for the one of the first set of queues as being less than a transmit clock value and having a greatest difference from the transmit clock value;

transmitting a set of data from the one of the first set of queues;

updating the first value with a cost of the set of data, the first value indicating when the one of the first set of queues will be eligible to transmit; and updating a second value indicating when the first set of queues will be eligible to transmit with the cost of the set of data.

17. The computer implemented method of claim 16 wherein updating the first and second value comprises:

increasing the first and second value with a size of the set of data transmitted; and modifying the increased first and second value respectively with a first and second weight respectively corresponding to the one of the first set of queues and the first set of queues.

18. The computer implemented method of claim 16 further comprising maintaining a third value indicating unused transmit time.

19. A computer implemented method comprising:

determining if at least one of a plurality of groups is eligible to transmit, each of the plurality of groups comprising a set of queues;

selecting an eligible one of highest priority of the plurality of groups having data to transmit upon determining at least one of the plurality of groups is eligible to transmit;

selecting an ineligible one of highest priority of the plurality of groups having data to transmit upon determining at least one of the plurality of groups is not eligible to transmit;

determining a queue having data as most eligible from the set of queues of the selected one of the plurality of groups, wherein determining a queue having data as most eligible from the set of queues of the selected one of the plurality of groups comprises:

calculating a first value for the queue as being less than a transmit clock value and having a greatest difference from the transmit clock value;

transmitting a set of data from the queue;

updating the first value with the cost of the set of data, the first value indicating when the transmitting queue will be eligible to transmit; and updating a second value with the cost of the set of data, the second value indicating when the selected one of the plurality of groups will be eligible to transmit.

20. The computer implemented method of claim 19 wherein updating the first and second value comprises:

increasing the first and second value with a size of the set of data transmitted; and modifying the increased first and second value respectively with a first and second weight respectively corresponding to the transmitting queue and the selected one of the plurality of queues.

21. The computer implemented method of claim 19 further comprising maintaining a third value indicating unused transmit time.

* * * * *